Sept. 28, 1965  R. SCHEIB, JR  3,209,223
SERVO MOTOR SYSTEM

Filed Nov. 5, 1948  2 Sheets-Sheet 1

INVENTOR.
RICHARD SCHEIB, JR.
BY
Herbert B. Thompson
his ATTORNEY.

Sept. 28, 1965 R. SCHEIB, JR 3,209,223
SERVO MOTOR SYSTEM
Filed Nov. 5, 1948 2 Sheets-Sheet 2

INVENTOR
RICHARD SCHEIB, JR.
BY
Herbert H. Thompson
his ATTORNEY

United States Patent Office 3,209,223
Patented Sept. 28, 1965

3,209,223
SERVO MOTOR SYSTEM
Richard Scheib, Jr., Hempstead, N.Y., assignor to Sperry Rand Corporation, a corporation of Delaware
Filed Nov. 5, 1948, Ser. No. 58,407
7 Claims. (Cl. 318—30)

This invention relates to servo motor systems and specifically concerns an improved method of stabilizing servo motor operation particularly while the servo motor is at or near a standstill.

In the type of servo motor system wherein an error signal is generated in response to positional discrepancies between signal generating devices, one at the reference member and one at the driven objects, and the sole control function is thereby provided, error derivatives or intergals, etc. are then derived in an appropriate amplifier. In this type of system, the signal generating device located at the driven object is normally connected thereto through a gear train. Regardless of the quality of the gear train, eventual wear will give rise to backlash causing servo motor hunting action when the driven member is standing still or is being driven synchronously with the reference member. While systems for minimizing backlash in the gear train are well known to the art, as the backlash is only objectionable insofar as it is a source of servo motor hunting action, the present invention proposes a novel manner of avoiding the hunting condition obtaining because of backlash.

In the type of servo motor system wherein the error signal controls higher derivatives of motion in the power control unit, for example, such as would prevail in a hydraulic control unit having a variable stroke pump controlled by a small servo motor, then gearing backlash in the stroking gear train, or normal dead spots inherent in variable displacement pump designs, lead to undesirable or spurious motion, known as wander, in the power control unit. This undesirable motion is particularly pronounced under standstill conditions. The present invention provides a simple means for eliminating wander.

It is therefore a principal object of the present invention to eliminate spurious servo motor action that is created as a result of backlash, or dead spots, in the power control unit.

Another object of this invention is to provide, in a servo motor system, means generating a corrective signal that may be employed to eliminate spurious servo motor action.

Another object is to provide means generating a corrective signal that has a corrective effect limited to the regions of servo motor operation that are most likely to experience spurious action such as hunting or wander.

Other objects and advantages will become apparent from the specification, taken in connection with the accompanying drawings wherein the invention is embodied in concrete form.

Figure 1:
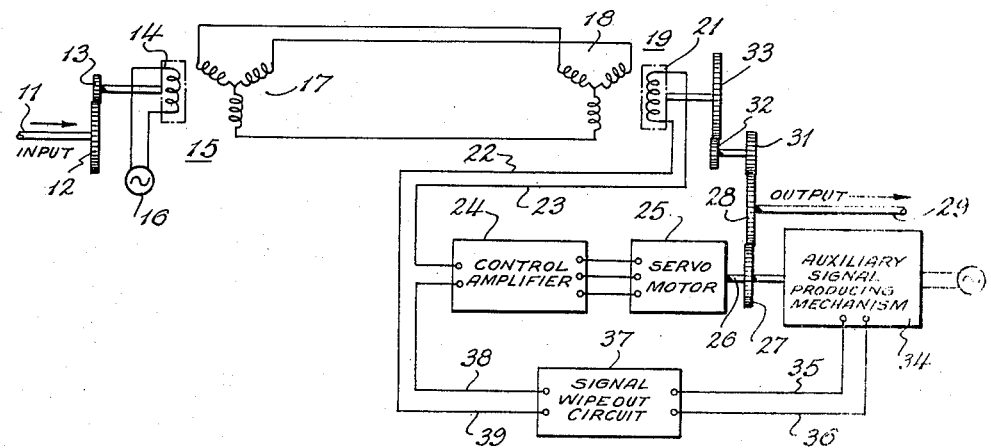
FIG. 1 is a schematic illustration of a servo motor system according to the present invention.

Referring now to the drawings, FIG. 1 sets forth an electric servo motor system wherein an input may be introduced at the shaft 11, in the form of a rotation, and is transmitted by the gears 12 and 13 to the rotor 14 of selsyn 15, which rotor may be energized from the alternating current source 16.

The field induced in the stator 17 is recreated in the stator 18 of selsyn 19, and in the event that the rotor 21 of selsyn 19 is in positional disagreement with that field, a signal will be generated therein, and this signal will appear in the lines 22, 23. Normally, the error signal from the rotor 21 would be transmitted directly to the control amplifier 24 and from there to energize the servo motor 25 in accordance with the error signal. The servo motor 25 is arranged to cause the shaft 26 to rotate the gears 27 and 28, the latter gear being secured to cause the output shaft 29 to accordingly rotate. The position of the output shaft 29 is transmitted back to the rotor 21 by means of the gears 31, 32 and 33, the rotor 21 being secured to gear 33. It is in the gears 31, 32 and 33 that backlash is normally experienced and it is this backlash that will cause servo motor hunting action within the backlash region. To overcome this spurious action of the servo motor, an auxiliary signal producing mechanism 34 is provided and will produce (in a manner more fully described in connection with FIG. 4) a signal output which, when combined with the original error signal, eliminates the hunting effect caused by the backlash in gears 31, 32 and 33. This signal output may be transmitted by lines 35 and 36 to a signal wipe-out circuit 37 also to be more fully described hereinafter, whereupon it is transmitted by lines 38, 39 to enter the control amplifier 24 in a sense opposing the error signal from the stator 21. By providing the auxiliary signal producing mechanism 34 with means for producing a signal in the range of zero error signal, and secondly, by causing that auxiliary signal to decay after an appropriate time, the effect of backlash may be eliminated as a cause of system wander.

Figure 2:
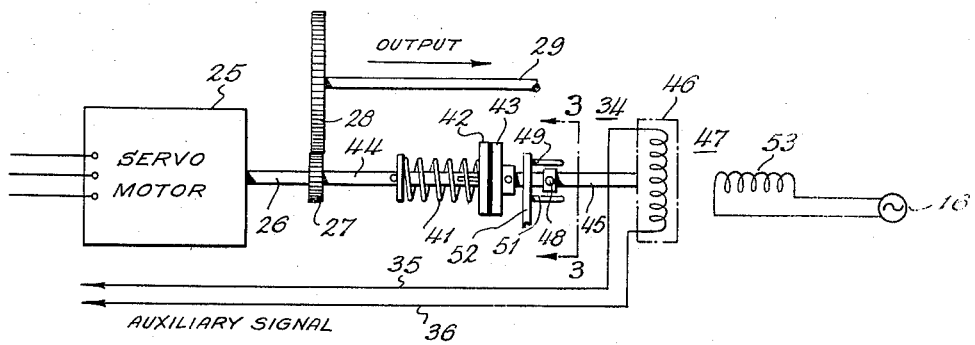
FIGS. 2 and 3 illustrate details of the friction coupling of the auxiliary signal producing mechanism.
Figure 3:
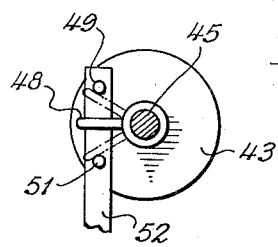

FIG. 2 illustrates the manner whereby the auxiliary signal may be produced. Secured directly to the shaft 26 is a shaft 44 having a spring loaded friction plate clutch including the spring 41 and friction plate 42 secured to the shaft 44 and held against the friction plate 43 by the spring 41. The friction plate 43 is secured to the shaft 45 which in turn is attached to the rotor 46 of a selsyn 47 to thereby cause the rotor 46 to be positioned in rotation in accordance with the friction plate 43. The magnitude of the signal derived from selsyn 47 varies as a sinusoid with displacement of the selsyn rotor, and said displacement is preferably limited so that said signal variation occurs over a portion of said sinusoid where the slope thereof does not change in sign. Accordingly, extending radially from shaft 45 is a finger 48 which may (as illustrated in FIG. 3), be stopped from further rotation beyond the limits indicated. The limits defined by the limit stops 49 and 51 may be in the neighborhood of 1° to 60° on one side of the null position of the selsyn. The limit stops 49 and 51 may be secured to a column or other appropriate mounting means 52. Thus, the maximum that the rotor 46 may be positioned in rotation is about 60° from a zero or null position which zero or null position may also be arranged to be the position producing a zero output signal from selsyn 47. The other winding 53 of the selsyn 47 may be energized from the line 16 to induce in the lines 35 and 36 an auxiliary signal limited in range, but having a magnitude which increases or decreases depending upon the direction of rotation of the servo motor in the region of zero error signal.

In the event that the high quality performance of the above described system is greater than desired for a given application, the signal wipe-out circuit may be eliminated in which case the synchro 47 would be arranged to travel between ± 30° from its null position which position would be that for a zero signal output.

Figure 4:
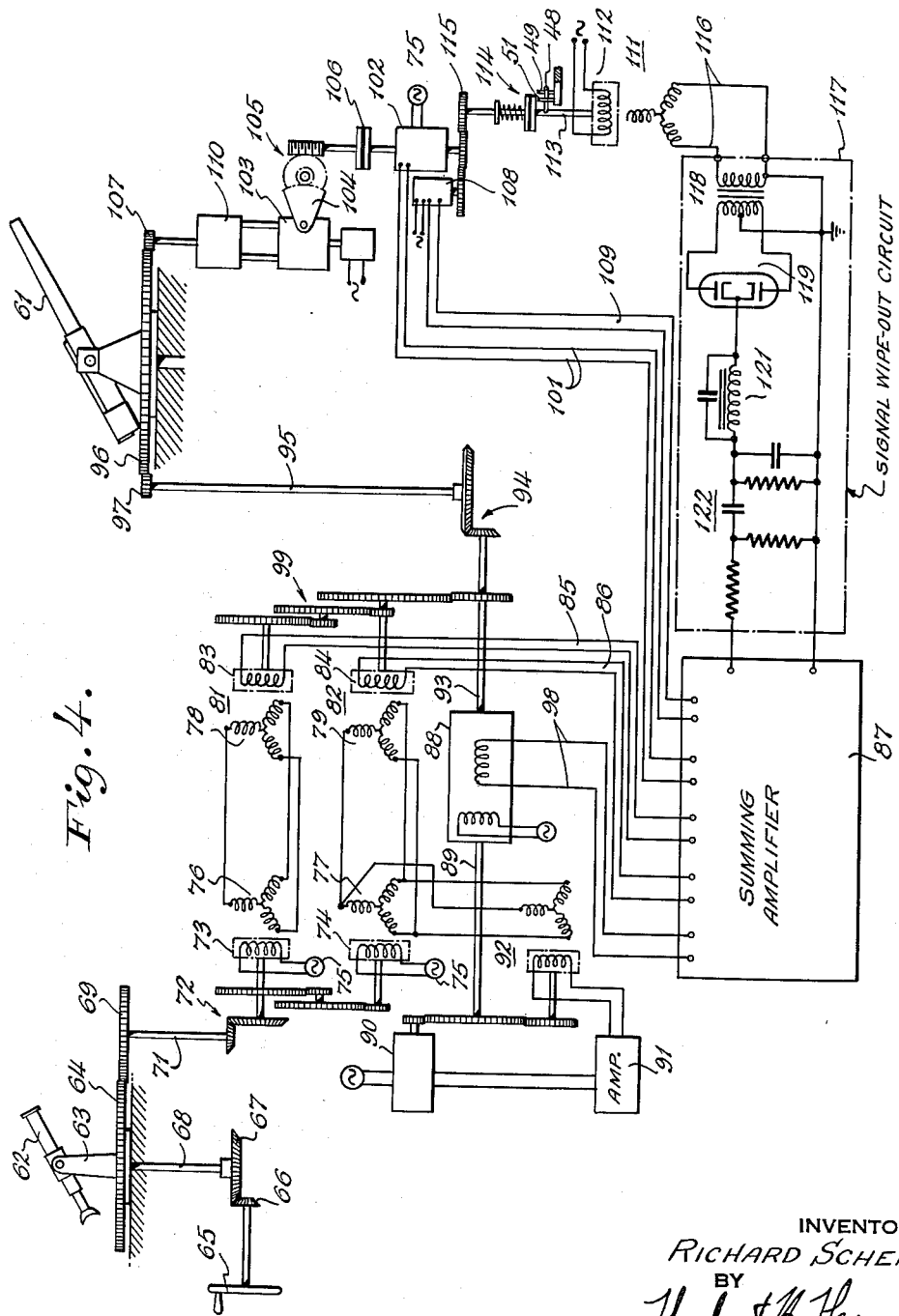
FIG. 4 is a schematic diagram of the present invention embodied in an electro-hydraulic servo mechanism.

FIG. 4 illustrates an embodiment of the present invention in an electro-hydraulic system wherein it is desired to position the driven object or gun 61 in accordance with the position of the reference member or telescope 62. While control about a single axis only is set forth, control about additional axes may be made by similar or other means. The telescope 62 is mounted on a trunnion 63 which is secured to the gear plate 64 for rotation in azimuth. The handcrank 65 is operatively associated through the gears 66 and 67 and the shaft 68 to rotate the gear plate in azimuth. Rotation of the telescope 62 is imparted by the gear 69 meshing with the gear plate 64 through the shaft 71 to the fine and coarse gear train generally identified at 72, to thereby cause the rotors 73 and 74 to be positioned one in accordance with the rotation of the telescope 62 and the other in accordance with a multiple of the rotation of the telescope 62. The rotors 73 and 74 may be energized from the line 75 and will induce in the stators 76, 77 an electromagnetic field. The orientation of this field is duplicated in stators 78 and 79 of remotely positioned selsyns 81 and 82, respectively. In the event that rotors 83 and 84 (which are positioned in rotation by the position of the gun 61 acting through the gear train 99) are in a positional disagreement with the rotors 73 and 74, a signal will be generated in each of these rotors and coarse and fine error signals will be transmitted by the lines 85, 86 as an input to the summing amplifier 87 wherein the coarse and fine error signals may be mixed in a manner well known to the art.

In order to produce an error rate signal, means such as a differential generator 88 may be provided. In the present embodiment, the rotor shaft 89 of the differential generator is positionally controlled by the servo motor 90 which is responsive to the signal output from an amplifier 91. The input to the amplifier 81 is obtained from a selsyn 92 or other servo motor device having an electromagnetic field that is made responsive to the field created in the stator 77. The field created in the stator 77 is responsive to the position in rotation of the telescope 62 and therefore the signal output from the amplifier 91 and the rotational output of the servo motor 90 shall be in accordance with the rotational position of the telescope 62. An alternative method of driving rotor shaft 89 would be to couple the shaft directly to the telescope 62 through the plate gear 64.

The stator shaft 93 of the differential generator 88 is geared through the gears 94 to be driven accordance with the rotation of a shaft 95 which in turn is rotated by the plate gear 96 through the spur gear 97, the plate gear 96 being a mounting platform for the gun 61. Upon the occurence of a differential rotational speed between the telescope 62 and the gun 61, an error rate signal may be supplied to the summing amplifier 87.

The summing amplifier 87 will produce, as an output, a control term corresponding to the fine and coarse error signals plus the rate of change of the displacement signal, and this output will be transmitted by the lines 101 as an input to the stroke servo motor 102. Stroke servo motor 102 may be energized from the line 75 and, upon energization will cause the variable delivery hydraulic pump 103 to be displaced by action of the sector 104 through gears 105. A slip clutch 106 may be inserted between the servo motor and the gears 105 to prevent damage to the pump stroking action. The hydraulic motor 110 is arranged to drive the plate gear 96 through the drive gear 107.

In order to provide stroke servo motor stabilization, a feedback signal proportional to servo motor speed is derived from an A.C. generator 108, driven by the servo motor 102, and this feedback signal may be transmitted by the lines 109 into the summing amplifier 87.

An auxiliary signal generating means including the selsyn 111 having its rotor 112 positioned in rotation by the shaft 113 within the limits defined by the limit stops 49 and 51 is energized from the line 75. A spring loaded slip clutch 114 is provided to maintain the clutch plates in frictional contact and the servo motor 102 is arranged to drive one of these plates through the gear 115. An auxiliary signal will be generated and transmitted by the line 116 to the summing amplifier 87.

In applications where the static signal from the auxiliary signal source 111 is too great to be tolerated, a signal wipe-out circuit 117 is provided including the transformer 118, the rectifier 119, filter 121 and the condenser-resistor or lead network 122. The voltage at line 116 may be 60 cycle A.C. of one phase only. The voltage from synchro 111 will vary from nearly zero to a maximum value for about 60 degrees of synchro rotation. This A.C. voltage is then rectified in the rectifier 119, so that the input voltage to filter 121 is always positive, for example, relative to ground. The unidirectional voltage derived from rectifier 119 is supplied to a differentiating network 122 and the voltage output of this network which is approximately proportional to the time rate of change of the input voltage is supplied to the summing amplifier 87. For illustration purposes the differentiating network is shown as a conventional impedance-capacitance network and its output voltage which is derived from the impedance will be of a polarity depending upon whether the unidirectional voltage input thereto is increasing or decreasing. The time after which the auxiliary signal will be effectively wiped out may be controlled by the proper selection of R-C values in the circuit 122, the time desired being one that will permit transmission of the auxiliary signal until spurious servo motor action is effectively eliminated. The wipe-out circuit functions to transmit the auxiliary signal therethrough for a limited period of time. The signal passing through the wipe-up circuit is then fed into the summing amplifier 87 in a sense such that it will control the servo motor to operate in a direction to reduce this signal. After the predetermined period of time has elapsed the circuit 117 acts to prevent transmission of the auxiliary signal therethrough and the system functions as an ordinary displacement plus displacement rate servo stysem.

In connection with the embodiment of my invention illustrated in FIG. 4, I have in the foregoing described the components and circuitry whereby a signal from signal generator 111 is supplied to the amplifier 87 which controls the operation of the motor 102. It will be understood that the signal generator 111 may be arranged to provide an operation of the system in two different manners and in each case the signal generator is arranged to operate in a different manner. Under all circumstances, the signal generator 111 is driven by the servo motor 102, in the embodiment illustrated, in accordance with the displacement output of said servo motor, but the angular rotation of the rotor 112 of the signal generator is limited by means of the limit stops 49 and 51, the slip clutch connection 114 permitting relative rotation between the output of the servo motor and the rotor of the signal generator.

Under one manner of operation, the alternating signal voltage derived from the signal generator 111 is supplied in degenerative fashion as an alternating signal input to the amplifier 87. In this case, of course, the signal wipe out circuit indicated at 117 is eliminated. Moreover, under this manner of operation, the rotor 112 of the signal generator is arranged to occupy a null position when the pin or finger 48 which is fixed to rotate with the rotor 112 occupies a position substantially midway between the limit stops 49 and 51. Rotation of the servo motor from this position in one direction will provide a signal voltage output from generator 111 of one phase sense and rotation of the motor in the opposite direction will provide a signal of the opposite phase sense. For example, motor 102 may rotate in one direction to effect synchronous rotation of the gun and sight and, if the finger 48 bears against one of the limit stops, the signal generator will provide maximum signal output of one phase sense which when fed degeneratively to the amplifier 87 will tend to cause rotation of the servo motor in the opposite direction. If the servo motor were to be reversed in its direction of drive to an extent sufficient to move finger 48 from one limit stop to the other, then the signal from generator 111 would pass through zero and reverse in phase to produce a feedback signal which would tend to drive the motor in the opposite direction so as to bring the finger away from the limit stop and toward its central position between the limit stops. Therefore, no matter what direction the servo motor is driven in, the output of signal generator 111 will be in a direction tending to cause the servo motor to bring the finger 48 to a position midway between the limit stops. It will be understood that the signal derived from the generator 111 or the signal proportional thereto which is supplied to the amplifier 87 is a comparatively low level signal, that is, very small as compared to the primary control signals such as those derived from the data transmission systems, or, in any event, the effect of this feedback signal from generator 111 is small compared to the effect of the primary signals in controlling the servo motor system.

In some instances, the effect produced by the displacement signal from signal generator 111 prevents the system from operating within specifications. In such cases, therefore, I propose to provide a transient signal rather than one which will persist under steady state conditions. For this alternative mode of operation, I provide the signal wipeout circuit shown in FIG. 4. However, when the wipeout circuit is employed, the signal generator is so arranged that the signal developed thereby does not reverse in phase but merely changes in amplitude as it is rotated from one limit stop position to the other. For example, when the finger 48 is in engagement with one limit stop, the signal output of the generator 111 may be zero or some finite quantity and the amplitude of this signal will increase as the finger is moved from the one limit stop to the other. Hence, when the servo motor reverses and the finger is driven in the opposite direction, the voltage output of the signal generator will decrease from some maximum value to a minimum value when the opposite limit stop is reached. The alternating signal voltage is supplied to the full wave rectifier 119 to develop a unidirectional voltage across the output of the rectifier circuit, that is, across the condenser and resistor connected in parallel across the output of the rectifier circuit, and this unidirectional voltage will increase as the signal generator is rotated in one direction and will decrease as the generator is rotated in the opposite direction. The unidirectional voltage output of the rectifier circuit is supplied to the differentiating network 122, the voltage being applied across the series-connected condenser and resistor, and the derivative voltage which appears across the resistor is supplied as an input to the amplifier 87. The derivative taking circuit will not pass a voltage to the summing amplifier if the unidirectional voltage input thereto is constant. However, when the input voltage to the differentiating circuit varies or changes in magnitude, a voltage will be developed across the resistor of the differentiating network which is approximately proportional to the time rate of change of the input signal voltage. If the input signal voltage is increasing, the time derivative voltage will be of one polarity while if the input signal voltage is decreasing the time derivative voltage will be of the opposite polarity. Therefore, the signal output of the wipeout circuit will be of a polarity depending upon the direction in which the rotor of the signal generator is driven. This signal is fed in degenerative or negative feedback fashion to the amplifier 87. In other words, the signal output of the wipeout circuit is supplied in any conventional manner so that it opposes an operation of the servo motor producing this feedback signal, or, causes the servo motor to drive in a direction to reduce said signal.

It will be observed that I have in the main described the operation of my invention in connection with the servo loop which embodies the amplifier 87, the servo motor 102 and the feedback signal generator 111 together with the associated circuits. This loop however forms a part of a second servo loop which embraces the sight 62 and the gun 61. The second loop contains the data transmission systems and the differential rate generator which provides primary control signals to the amplifier 87 to effect synchronism between the sight and the gun. The first described servo loop functions, in the main, to stabilize the stroking motor or servo motor 102 which controls the output of the hydraulic servo mechanism comprising the pump 103 and the motor 110. Hence, whenever the sight and gun are synchronized either in a static or dynamic state of synchronism, the servo motor 102 will be stationary since its movements are proportional to accelerations in the servo loop embracing the sight and gun. It follows therefore that the present invention serves to prevent hunting either while the sight and gun are at a standstill or experiencing synchronous rotation.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. In a system of the character described, a servo mechanism including a servo motor, a source of control signal for controlling the output of said servo motor, a two-part signal generator having one part thereof movable, the other part being fixed, means for driving said movable part in accordance with movements of said servo motor, means for limiting the range of movement through which the movable part of said generator is driven, and means for applying the signal output of said signal generator in negative feedback fashion to control said servo motor, said feedback means including means for wiping out the signal output of said signal generator when said output is unvarying whereby no signal of constant value from said signal generator is fed back.

2. In a system of the character described, a servo motor, an amplifier connected to control said servo motor, a source of control signal connected in controlling relation to said amplifier, a two part signal generator having one part thereof movable, the other part being fixed, means for driving said movable part in accordance with servo motor displacements including means for limiting the range of movement through which the movable part of said generator is driven, and means for applying the signal output of said generator in negative feedback fashion to said amplifier, said feedback means including means for wiping out the signal output of said signal generator when said output is unvarying whereby no signal of constant value from said signal generator is fed back.

3. In a system of the character described, a servo motor, an amplifier connected to control said servo motor, a source of control signal connected in controlling relation to said amplifier, a two-part signal generator having one part thereof movable, the other part being fixed, means for driving said movable part from said servo motor including a slip clutch connection, limit stops for limiting the range through which the movable part of said generator may be driven, and means for applying the signal output of said generator in negative feedback fashion to said amplifier, said feedback means including means for wiping out the signal output of said signal generator when said output is unvarying whereby no signal of constant value from said signal generator is fed back.

4. In a system of the character described, a servo motor, an amplifier connected to control said servo motor, a source of control signal connected in controlling relation to said amplifier, an alternating signal voltage generator having two parts, one of said parts being movable, the other of said parts being fixed, means for driving said movable part in accordance with servo motor displacements including means for limiting the range of movement through which the movable part of said generator is driven, means for rectifying said alternating signal voltage to provide a unidirectional voltage having a magnitude proportional to the amplitude of said alternating signal voltage, and means including an impedance capacitance network connected to receive said unidirectional voltage and having its output connected in degenerative fashion to said amplifier.

5. In a system of the character described, a servo motor, an amplifier connected to control said servo motor, a source of control signal connected in controlling relation to said amplifier, an alternating signal voltage generator having two parts, one of said parts being movable, the other of said parts being fixed, means for driving said movable part from said servo motor including a slip clutch connection and limit stops for limiting the range through which the movable part of said generator may be driven, means for rectifying said alternating signal voltage to provide a unidirectional voltage having a magnitude proportional to the amplitude of said alternating signal voltage, a differentiating network connected to receive said unidirectional voltage, and means for applying the derivative voltage output of said network in negative feedback fashion to said amplifier.

6. In a positional control system, means to maintain a controlling and a controlled object in synchronism including motive means for driving said controlled object, said motive means being connected to said controlled object through motion transmission means capable of producing lost motion when operated, a transmitter unit positioned in accordance with movements of said controlling object and a receiver unit positioned in accordance with movements of said controlled object, said units being connected to provide a first signal for controlling said motive means, and means for arresting wander of said motive means where due to said lost motion such wander is not arrested by said synchronizing means, said arresting means comprising a two-part signal generator for producing a second signal for controlling said motive means, said generator having one part positioned directly in accordance with movements of said motive means and the other part being fixed relative to said positionable part, and means for wiping out said second signal when it is unvarying whereby a constant value of second signal is prevented from disturbing the synchronism otherwise produced between said controlling and controlled objects.

7. In a system having a driven object controlled by motive means to move synchronously with a reference member, said motive means being capable of wandering about its position of synchronization, the combination comprising a first source of control signal including a transmitter unit and a receiver unit, motion transmission means connecting said motive means to position one of said units, a second source of control signal including a two-part signal generator having but one part thereof movable and having an output whose magnitude varies as a sinusoid with movements of said movable part, means connecting said movable part to said motive means whereby said part is positioned directly in accordance with movements of said motive means, means for limiting the operation of said signal generator to a portion of said sinusoid where the slope thereof does not change in sign, means to wipe out the output of said signal generator when said output is unvarying, and means for mixing the signals from said first source and said wipe-out means for controlling said motive means whereby the signal output of said wipe-out means acts to prevent wander of the motor about the synchronization position thereof.

References Cited by the Examiner

UNITED STATES PATENTS

| 1,977,624 | 10/34 | Davis | 318—30 |
| 2,531,488 | 11/50 | Wolf | 318—24 |
| 2,537,083 | 1/51 | Peoples | 318—30 |

FOREIGN PATENTS 610,029   10/48   Great Britain.

JOHN F. COUCH, *Primary Examiner.*

RALPH R. YOUNG, ORIS L. RADER, N. H. EVANS, JAMES L. BREWRINK, *Examiners.*